United States Patent
Yamaki et al.

(10) Patent No.: US 12,021,284 B2
(45) Date of Patent: Jun. 25, 2024

(54) ION EXCHANGE MEMBRANE SUITABLE FOR REDOX FLOW BATTERY

(71) Applicant: AGC Inc., Chiyoda-ku (JP)

(72) Inventors: Yasushi Yamaki, Chiyoda-ku (JP); Kosuke Sumikura, Chiyoda-ku (JP); Tatsuya Miyajima, Chiyoda-ku (JP); Takuo Nishio, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 279 days.

(21) Appl. No.: 16/865,576

(22) Filed: May 4, 2020

(65) Prior Publication Data

US 2020/0266472 A1    Aug. 20, 2020

Related U.S. Application Data

(63) Continuation of application No. PCT/JP2018/041161, filed on Nov. 6, 2018.

(30) Foreign Application Priority Data

Nov. 6, 2017   (JP) .................................. 2017-213888

(51) Int. Cl.
*H01M 8/1039*    (2016.01)
*C08J 5/22*    (2006.01)
(Continued)

(52) U.S. Cl.
CPC ......... *H01M 8/1039* (2013.01); *C08J 5/2237* (2013.01); *H01M 8/1023* (2013.01);
(Continued)

(58) Field of Classification Search
CPC .................. C08J 327/18; C08J 5/2237; H01M 2008/1095; H01M 2300/0082;
(Continued)

(56) References Cited

U.S. PATENT DOCUMENTS

2011/0020728 A1*  1/2011  Kita .......................... C08F 8/22
                                                                 521/27
2014/0377687 A1* 12/2014  Miyake ............... H01M 8/1039
                                                                 429/492

(Continued)

FOREIGN PATENT DOCUMENTS

| JP | 2014-135144 A | 7/2014 | |
| JP | 2015-097219 A | 5/2015 | |
| WO | WO-2017171239 A1 * | 10/2017 | .............. B01J 39/20 |

OTHER PUBLICATIONS

International Search Report issued Jan. 15, 2019 in PCT/JP2018/041161 filed on Nov. 6, 2018, 2 pages.

(Continued)

*Primary Examiner* — Adam A Arciero
(74) *Attorney, Agent, or Firm* — Oblon, McClelland, Maier & Neustadt, L.L.P.

(57) ABSTRACT

The present invention provides an ion exchange membrane can improve the current efficiency of a redox flow battery without a drop in voltage efficiency, when used in the redox flow battery. The ion exchange membrane of the present invention is an ion exchange membrane comprising a fluorinated polymer having sulfonic acid functional groups, wherein the difference (D–Dc) between the distance D between ionic clusters and the diameter Dc of ionic clusters as measured by the small angle X-ray scattering is 0.60 nm or more, and the ion exchange capacity of the fluorinated polymer is 0.95 meq/gram dry resin or more.

10 Claims, 1 Drawing Sheet

(51) Int. Cl.
  *H01M 8/10* (2016.01)
  *H01M 8/1023* (2016.01)
  *H01M 8/18* (2006.01)

(52) U.S. Cl.
  CPC ......... *H01M 8/188* (2013.01); *C08J 2327/18* (2013.01); *H01M 2008/1095* (2013.01)

(58) Field of Classification Search
  CPC ............. H01M 8/1023; H01M 8/1039; H01M 8/1048; H01M 8/1053; H01M 8/1055; H01M 8/106; H01M 8/1067; H01M 8/1083; H01M 8/1088; H01M 8/188
  See application file for complete search history.

(56) References Cited

U.S. PATENT DOCUMENTS

2017/0137952 A1* 5/2017 Kaneko .................... B01J 47/12
2019/0321814 A1* 10/2019 Moon .................... C08J 5/2237

OTHER PUBLICATIONS

Gierke, et al., "The Morphology in Nafion Perfluorinated Membrane Products, as determined by Wide- and Small-Angle X-Ray Studies", Journal of Polymer Science: Polymer Physics Edition, vol. 19, 1981, 10 pages.
Kenneth A. Mauritz et al., "State of Understanding of Nafion", Chem. Rev. 2004, 104, XP002516304, pp. 4535-4585.
Klaus Schmidt-Rohr et al., "Parallel Cylindrical Water Nanochannels in Nation Fuel-cell Membranes", Nature Materials, vol. 7, Jan. 2008, 2008 Nature Publishing Group, XP055824018, pp. 75-83 and cover page.

* cited by examiner

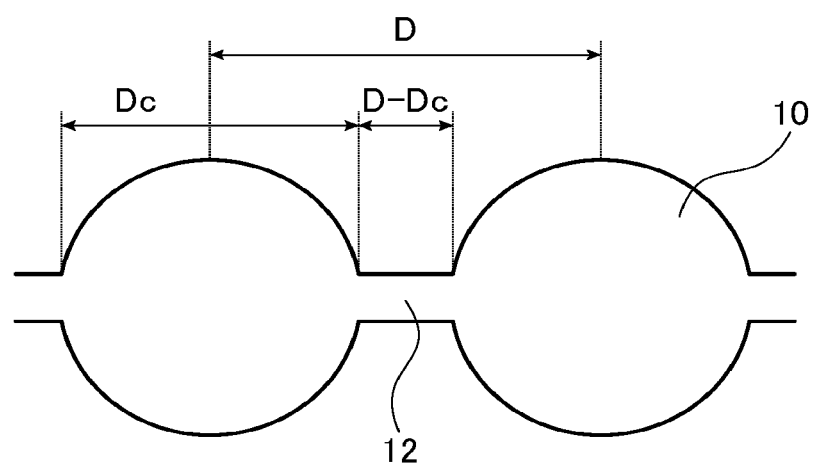

ION EXCHANGE MEMBRANE SUITABLE FOR REDOX FLOW BATTERY

TECHNICAL FIELD

The present invention relates to an ion exchange membrane suitable for redox flow batteries.

BACKGROUND ART

In recent years, secondary batteries capable of storing and discharging electricity, especially redox flow batteries, have been drawing attention. Redox flow batteries can be used as a system to store surplus electricity generated from natural energy such as wind and solar power. Patent Document 1 discloses a redox flow battery having a cathode and an anode separated by an ion exchange membrane (paragraph 0063 and the like).

PRIOR ART DOCUMENTS

Patent Documents

Patent Document 1: JP-A-2015-097219

DISCLOSURE OF INVENTION

Technical Problem

Recent years have seen growing demands on the performance of ion exchange membranes to provide redox flow batteries with higher performance. Specifically speaking, ion exchange membranes which can increase the charge/discharge energy efficiency of redox flow batteries are desired. In order to increase energy efficiency, it is necessary to improve at least either of voltage efficiency and current efficiency. However, many conventional batteries have the problem of a huge drop in voltage efficiency accompanying an increase in current efficiency.

In view of the above circumstances, the present invention aims to provide an ion exchange membrane which can improve the current efficiency of a redox flow battery without a drop in voltage efficiency when used in the redox flow battery.

Solution to Problem

As a result of their extensive studies on the above-mentioned problem, the present inventors have found that the desired effect can be obtained by adjusting the difference (D-Dc) between the distance D between ionic clusters and the diameter Dc of ionic clusters, and the ion exchange capacity, and have accomplished the present invention.

The present invention has the following aspects.

(1) An ion exchange membrane comprising a fluorinated polymer having sulfonic acid functional groups, wherein the difference (D-Dc) between the distance D between ionic clusters and the diameter Dc of ionic clusters as measured by the small angle X-ray scattering is at least 0.60 nm, and the ion exchange capacity of the fluorinated polymer is at least 0.95 meq/g dry resin.

(2) The ion exchange membrane according to (1), wherein the difference (D-Dc) between the distance D between ionic clusters and the diameter Dc of ionic clusters is at least 0.70 nm.

(3) The ion exchange membrane according to (1) or (2), wherein the distance D between ionic clusters is from 3.50 to 5.00 nm.

(4) The ion exchange membrane according to any one of (1) to (3), wherein the ion exchange capacity of the fluorinated polymer is from 1.00 to 1.10 meq/g dry resin.

(5) The ion exchange membrane according to any one of (1) to (4), which is from 30 to 500 μm in thickness.

(6) The ion exchange membrane according to any one of (1) to (5), wherein the fluorinated polymer comprises units based on a fluoroolefin and units based on a fluorine-containing monomer having a sulfonic acid functional group.

(7) The ion exchange membrane according to (6), wherein the units based on a fluoroolefin are units based on tetrafluoroethylene.

(8) The ion exchange membrane according to (6) or (7), wherein the units based on a fluorine-containing monomer having a sulfonic acid functional group are represented by the formula (1), which will be mentioned later.

(9) The ion exchange membrane according to (8), wherein the units represented by the formula (1) are units represented by the formula (1-4), which will be mentioned later.

(10) The ion exchange membrane according to any one of (1) to (9), which has a reinforcing material inside.

(11) A method for producing the ion exchange membrane as defined in any one of (1) to (10), which comprises producing a precursor membrane of a fluorinated polymer having groups convertible to sulfonic acid functional groups, and converting the groups convertible to sulfonic acid functional groups in the precursor membrane to sulfonic acid functional groups.

(12) The method according to (11), wherein the groups convertible to sulfonic acid functional groups in the precursor membrane are converted to sulfonic acid functional groups by bringing the groups convertible to sulfonic acid functional groups in the precursor membrane into contact with an aqueous alkaline solution.

(13) The method according to (11) or (12), wherein the aqueous alkaline solution contains an alkali metal hydroxide, a water-miscible organic solvent and water.

(14) The ion exchange membrane according to any one of (1) to (10), which is used for a redox flow battery.

(15) The ion exchange membrane according to any one of (1) to (10), which is used for a redox flow battery having a current density lower than 120 mA/cm$^2$ during charging and discharging.

Advantageous Effects of Invention

According to the present invention, it is possible to provide an ion exchange membrane which can improve the current efficiency of a redox flow battery, especially a redox flow battery with a low charge/discharge current density (a redox flow battery with a charge/discharge current density less than 120 mA/cm$^2$), without a drop in voltage efficiency, when used in the redox flow battery.

BRIEF DESCRIPTION OF DRAWINGS

FIG. 1 A illustration explaining the distance D between ionic clusters and the diameter Dc of ionic clusters.

DESCRIPTION OF EMBODIMENTS

The following terms used herein have the following meanings.

An "ion exchange group" is a group at least partly containing an ion which can be exchanged for another ion, such as a sulfonic acid functional group, which will be described below.

A "sulfonic acid functional group" means a sulfonic acid group ($-SO_3H$) or a sulfonate group ($-SO_3M^2$ wherein $M^2$ is an alkali metal or a quaternary ammonium ion).

A "precursor membrane" is a membrane comprising a polymer having groups convertible to ion exchange groups.

A "group convertible to an ion exchange group" means a group which can be converted to an ion exchange group by treatments such as hydrolysis and conversion to an acid form.

A "group convertible to a sulfonic acid functional group" means a group which can be converted to a sulfonic acid functional group by treatments such as hydrolysis and conversion to an acid form.

A "perfluorinated hydrocarbon group" means a hydrocarbon group in which all the hydrogen atoms have been replaced by fluorine atoms.

An "aliphatic perfluorinated hydrocarbon group" means an aliphatic hydrocarbon group in which all the hydrogen atoms have been replaced by fluorine atoms.

A "unit" in a polymer mean an atomic group derived from 1 molecule of a monomer by polymerization. A unit may be an atomic group directly formed by a polymerization reaction, or may be an atomic group having a partially different structure obtained by polymerization followed by partial structural conversion.

A "reinforcing material" means a material used to improve the strength of an ion exchange material. The reinforcing material is preferably a derivative of a reinforcing fabric.

A "reinforcing fabric" means a fabric used as a raw material of a reinforcing material used to improve the strength of an ion exchange material.

"Reinforcing threads" are threads constituting a reinforcing fabric which do not dissolve in an operating battery containing an ion exchange membrane. The "reinforcing threads" are preferably made of a material which will not dissolve when the reinforcing fabric is immersed in an aqueous alkaline solution (such as 32 mass % aqueous sodium hydroxide).

"Sacrificial threads" are threads constituting a reinforcing fabric which at least partly dissolve in an operating battery containing an ion exchange membrane. The "sacrificial threads" are preferably made of a material which dissolves in an aqueous alkaline solution when the reinforcing fabric is immersed in the aqueous alkaline solution.

A numerical range expressed by using "to" includes the figures before and after "to" as the lower limit and the upper limit.

[Ion Exchange Membrane]

The ion exchange membrane of the present invention comprises a fluorinated polymer having sulfonic acid functional groups (hereinafter referred to also as "fluorinated polymer (S)), and the difference (D-Dc) between the distance D between ionic clusters and the diameter Dc of ionic clusters as measured by the small angle X-ray scattering is at least 0.60 nm, and the ion exchange capacity of the fluorinated polymer is at least 0.95 meq/g dry resin.

A redox flow battery using the ion exchange membrane of the present invention shows an excellent current efficiency without a drop in voltage efficiency supposedly for the following reasons.

The ion exchange membrane of the present invention has a separated micromorphology comprising the fluorinated hydrocarbon backbone of the fluorinated polymer as the hydrophobic region and ion exchange sulfonic acid functional groups, and several sulfonic acid functional groups aggregate to form ionic clusters with coordinating water molecules around them.

More specifically speaking, in an ion exchange membrane, plural ionic clusters 10 of large size are formed with ion channels 12 of smaller size interconnecting them, as shown in FIG. 1. The ion channels eventually run through the membrane in the thickness direction to function as conductive channels for ions (especially protons $H^+$).

The present inventors found that the problem of a drop in current efficiency in the prior art is caused by transport of vanadium ions across an ion exchange membrane. According to the present invention, it is supposed that an increase of the length D-Dc of ion channels to at least certain level suppresses transport of vanadium ions and thereby increases current efficiency.

As described later, they have also found that a drop in voltage efficiency can be suppressed by increasing the ion exchange capacity to at least a certain level. Though this effect is mentioned only for systems using vanadium redox species, a similar effect should be seen, in principle, in redox flow batteries using any other redox species.

In particular, the ion exchange membrane of the present invention is suitable for redox flow batteries with low charge/discharge current densities because the above-mentioned effect of the membrane is more remarkable in such redox flow batteries. Herein, "low charge/discharge current density" means a charge/discharge current density lower than 120 mA/cm², usually at least 60 mA/cm² and lower than 120 mA/cm².

Various models have been proposed for ion conduction in ion exchange membranes containing fluorinated ion exchange resins (ion exchange resins containing fluorine atoms). Among them, the ionic cluster model proposed by Gierke et al. is known (GIERKE, T. D.; MUNN, G. E.; WILSON, FCd. The morphology in nafion perfluorinated membrane products, as determined by wide- and small-angle x-ray studies. Journal of Polymer Science Part B: Polymer Physics, 1981, 19.11: 1687-1704). The paper uses the following three formulae to calculate the diameter Dc of ion clusters $$\Delta V = \rho_p \Delta m / \rho_w \qquad \text{Formula (A)}$$

$$Vc = [\Delta V/(1+\Delta V)]D^3 + Np Vp \qquad \text{Formula (B)}$$

$$Dc = (6Vc/\pi)^{1/3} \qquad \text{Formula (C)}$$

In the formulae, $\Delta V$ is the volume change of a polymer, $\rho_p$ the density of the polymer, $\rho_w$ the density of water, $\Delta m$ the water content of the polymer, Vc the volume of clusters, D the distance between ion clusters, Np the number of ion exchange sites in the clusters, and Vp the volume of an ion exchange site, respectively.

Herein, the diameter Dc of ionic clusters and the distance D-Dc of the channels between ionic clusters are calculated by using the ion cluster model described in the above-mentioned paper.

In the paper, Vp in the formula (B) indicates the volume (thickness) of an ion exchange site, and the value for Vp is taken as 68×10$^{-24}$ cm$^3$ and corresponds to an effective radius of ion exchange sites of 0.25 nm. Herein, to exclude the effective radius of ion exchange sites from the diameter Dc of ionic clusters, calculations are made on the assumption that Vp is 0. Namely, herein, the above formula (B) is deemed to be Vc=[ΔV/(1+ΔV)]D$^3$.

Therefore, the diameter Dc of ionic clusters is given by the following formula (D).

$$Dc=\{(\Delta V/(1-\Delta V))\times D^3\times(6/\pi)\}^{1/3} \quad \text{Formula (D)}$$

The distance D between ionic clusters used to calculate the diameter Dc is determined by small angle X-ray scattering as described later in the Examples.

The calculation of ΔV will be described in detail later in the Examples.

The distance D between ionic clusters measured by small angle X-ray scattering is preferably at least 3.50 nm, more preferably at least 4.00 nm, further preferably at least 4.30 nm, and preferably at most 5.00 nm, more preferably at most 4.80 nm, further preferably at most 4.50 nm, in view of the balance between current efficiency and voltage efficiency.

The difference (D–Dc) between the distance D between ionic clusters and the diameter Dc of ionic clusters is at least 0.60 nm, preferably at least 0.65 nm, more preferably at least 0.70 nm, further preferably at least 0.72 nm in view of the balance between current efficiency and voltage efficiency. In view of the balance between current efficiency and voltage efficiency and easy polymer production, it is preferably at most 1.00 nm, more preferably at most 0.90 nm, further preferably at most 0.85 nm.

The (D–Dc) value can be adjusted by the conditions for hydrolysis of the membrane and for drying the membrane after hydrolysis.

The ion exchange capacity of the fluorinated polymer (S) is at least 0.95 meq/g dry resin. Hereinafter, "meq/g dry resin" will sometimes be omitted. When the ion exchange capacity of the fluorinated polymer (S) is at least 0.95, high voltage efficiency is attained. The ion exchange capacity of the fluorinated polymer (S) is preferably at least 1.00 for higher voltage efficiency.

In view of the balance between current efficiency and voltage efficiency, the ion exchange capacity of the fluorinated polymer (S) is at most 1.60, more preferably at most 1.25, more preferably at most 1.10.

The thickness of the ion exchange membrane is preferably at least 30 μm, more preferably at least 40 μm to secure a certain level of strength, and it is preferably at most 100 μm, more preferably at most 80 μm, further preferably at most 60 μm, for high current efficiency and voltage efficiency.

The fluorinated polymer (S) to be used in the ion exchange membrane may be a single species or a mixture or laminate of two or more species.

Though the ion exchange membrane may contain a polymer other than the fluorinated polymer (S), it is preferred to practically consist of the fluorinated polymer (S). Practically consist of the fluorinated polymer(S) means that the content of the fluorinated polymer (S) is at least 90 mass % of the total mass of the polymers in the ion exchange membrane. The upper limit of the content of the fluorinated polymer (S) is 100 mass % relative to the total mass of the polymers in the ion exchange membrane.

As specific examples of the polymers other than the fluorinated polymer (S), polyazole compounds selected from the group consisting of polymers of heterocyclic compounds containing at least one ring-constituting nitrogen atom and polymers of heterocyclic compounds containing at least one ring-constituting nitrogen atom and at least one ring-constituting oxygen and/or sulfur atom.

Specific examples of the polyazole compounds include polyimidazoles, polybenzimidazoles, polybenzobisimidazoles, polybenzoxazoles, polyoxazoles, polythiazoles, polybenzothiazoles and the like.

In view of the oxidation resistance of the ion exchange membrane and control of the diameter of ionic clusters, the other polymer may be a polyphenylene sulfide resin or a polyphenylene ether resin.

The fluorinated polymer (S) preferably comprises units based on a fluoroolefin and units based on a fluorine-containing monomer having a sulfonic acid functional group.

The fluoroolefin may, for example, be a $C_{2-3}$ fluoroolefin having at least one fluorine atom in the molecule. Specific examples of the fluoroolefin include tetrafluoroethylene (hereinafter referred to also as TFE), chlorotrifluoroethylene, vinylidene fluoride, vinyl fluoride and hexafluoropropylene. Among them, TFE is preferred in view of the production cost of the monomer, the reactivity with other monomers and the ability to give an excellent fluorinated polymer (S).

The fluoroolefin may be a single species or a combination of two or more species.

The units based on a fluorine-containing monomer having a sulfonic acid functional group are preferably units represented by the formula (1).

$$—[CF_2—CF(-L-(SO_3M)_n)]— \quad \text{Formula (1)}$$

L is a (n+1)-valent perfluorinated hydrocarbon group which may contain an oxygen atom.

The oxygen atom may be located at the end of the perfluorinated hydrocarbon group or between carbon atoms.

The number of carbon atoms in the (n+1)-valent perfluorinated hydrocarbon group is preferably at least 1, more preferably at least 2 and is preferably at most 20, more preferably at most 10.

L is preferably a (n+1)-valent perfluorinated aliphatic hydrocarbon group, more preferably a divalent perfluoroalkylene group which may contain an oxygen atom when n=1 or a trivalent perfluoroalkylene group which may contain an oxygen atom when n=2.

The divalent perfluoroalkylene group may be linear or branched.

M is a hydrogen atom, an alkali metal or a quaternary ammonium cation.

n is an integer of 1 or 2.

The units represented by the formula (1) are preferably units represented by the formula (1-1), units represented by the formula (1-2) or units represented by the formula (1-3).

—[CF$_2$—CF(—O—R$^{f1}$—SO$_3$M)]—     Formula (1-1)

—[CF$_2$—CF(—R$^{f1}$—SO$_3$M)]—     Formula (1-2)

Formula (1-3)
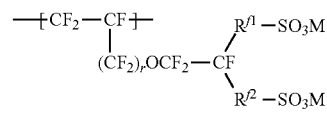

R$^{f1}$ is a perfluoroalkylene group which may contain an oxygen atom between carbon atoms. The number of carbon atoms in the perfluoroalkylene group is preferably at least 1, more preferably at least 2, and preferably at most 20, more preferably at most 10.

$R^{f2}$ is a single bond or a perfluoroalkylene group which may contain an oxygen atom between carbon atoms. The number of carbon atoms in the perfluoroalkylene group is preferably at least 1, more preferably at least 2, and preferably at most 20, more preferably at most 10.

r is an integer of 0 or 1.

M is a hydrogen atom, an alkali metal or a quaternary ammonium cation.

The units represented by the formula (1) are more preferably units represented by the formula (1-4).

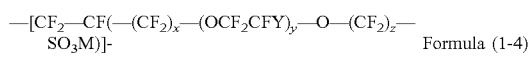
Formula (1-4)

x is an integer of 0 or 1, y is an integer of from 0 to 2, z is an integer of from 1 to 4, and Y is F or $CF_3$. M is the same as defined above.

Specific examples of units represented by the formula (1-1) include the following units wherein w is an integer of from 1 to 8, x is an integer of from 1 to 5, and M is the same as defined above.

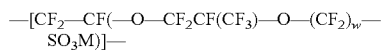

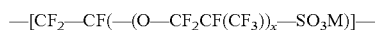

Specific examples of units represented by the formula (1-2) include the following units wherein w is an integer of from 1 to 8, and M is the same as defined above.

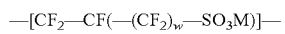

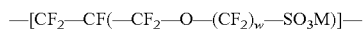

The units represented by the formula (1-3) are preferably units represented by the formula (1-3-1) wherein M is the same as defined above.

Formula (1-3-1)
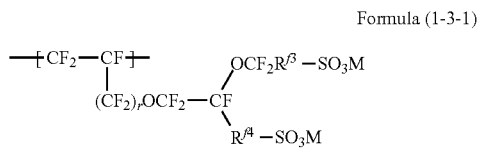

$R^{f3}$ is a linear $C_{1-6}$ perfluoroalkylene group, $R^{f4}$ is a single bond or a linear $C_{1-6}$ perfluoroalkylene group which may contain an oxygen atom between carbon atoms. r and M are the same as defined above.

Specific examples of the units represented by the formula (1-3) include the following units.

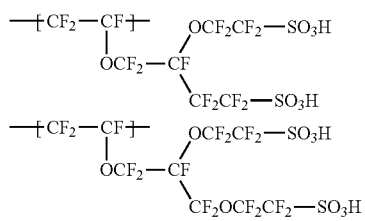

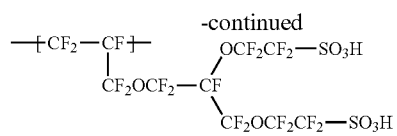

The fluorine-containing monomer having a sulfonic acid functional group may be a single species or a combination of two or more species.

The fluorinated polymer (S) may comprise units based on an additional monomer other than units based on the fluoroolefin and units based on a fluorine-containing monomer having a sulfonic acid functional group.

The additional monomer may, for example, be $CF_2=CFR^{f5}$ (wherein $R^{f5}$ is a $C_{2-10}$ perfluoroalkyl group), $CF_2=CF-OR^{f6}$ (wherein $R^{f6}$ is a $C_{1-10}$ perfluoroalkyl group) or $CF_2=CFO(CF_2)_vCF=CF_2$ (wherein v is an integer of from 1 to 3).

The content of units based on the additional monomer is preferably at most 30 mass % relative to all the units in the fluorinated polymer (S) to secure a certain level of ion exchange performance.

The ion exchange membrane may have a monolayer or a multilayer structure. In the case of a multilayer structure, a laminate of plural layers containing the fluorinated polymer (S) different in ion exchange capacity or constituting units may be mentioned.

The ion exchange membrane may comprise a reinforcing material inside. Namely, the ion exchange membrane may comprise the fluorinated polymer (S) and a reinforcing material.

The reinforcing material preferably comprise a reinforcing fabric (preferably a woven fabric). In addition to reinforcing fabrics, fibrils and porous materials may be mentioned as the reinforcing material.

The reinforcing fabric may be a woven fabric, a nonwoven fabric or the like, and is preferably a woven fabric made of warp and weft, and the woven fabric may be a plain weave fabric, a twill fabric or a satin fabric, preferably a plain weave fabric. The woven fabric is preferably made of warp yarns and weft yarns orthogonally woven. The reinforcing fabric is preferably made of reinforcing threads and sacrificial threads.

The reinforcing threads are preferably made of at least one material selected from polyterafluoroethylenes, polyphenylene sulfides, nylons and polypropylenes.

The sacrificial threads may be monofilaments or may be multi-filaments composed of two or more filaments.

While the sacrificial threads impart strength to the ion exchange membrane when it is being produced or handled to be installed in a battery, they dissolve in an operating battery, and thereby lower the resistance of the membrane.

The ion exchange membrane may have an inorganic particle layer comprising inorganic particles and a binder on the surface. The inorganic particle layer is preferably formed on at least either surface of the ion exchange membrane, more preferably on both surfaces of the membrane.

Formation of the inorganic particle layer makes the ion exchange membrane more hydrophilic and ion conductive.

[Production of Ion Exchange Membrane]

The ion exchange membrane of the present invention is preferably produced by producing a membrane (hereinafter referred to also as precursor membrane) of a fluorinated polymer having groups convertible to sulfonic acid functional groups, and then converting the groups convertible to sulfonic acid functional groups in the precursor membrane to sulfonic acid functional groups.

The fluorinated polymer having groups convertible to sulfonic acid functional groups is preferably a copolymer (hereinafter referred to also as fluorinated polymer (S')) of a fluoroolefin and a fluorine-containing monomer (hereinafter referred to also as fluorine-containing monomer (S')) having a group convertible to a sulfonic acid functional group.

The copolymerization may be carried out by any known technique such as solution polymerization, suspension polymerization or emulsion polymerization.

The fluoroolefin may be any of those mentioned previously and is preferably TFE in view of the production cost of the monomer, the reactivity with other monomers and the ability to give an excellent fluorinated polymer (S).

The fluoroolefin may be a single species or a combination of two or more species.

The fluorine-containing monomer (S') may be a compound having at least one fluorine atom in the molecule, and having an ethylenic double bond and a group convertible to a sulfonic functional group.

The fluorine-containing monomer (S') is preferably a compound represented by the formula (2) in view of the production cost of the monomer, the reactivity with other monomers and the ability to give an excellent fluorinated polymer (S).

 Formula (2):

L and n in the formula (2) are the same as defined above.

A is a group convertible to a sulfonic acid functional group. The group convertible to a sulfonic acid functional group is preferably a functional group convertible to a sulfonic acid functional group by hydrolysis. Specific examples of the group convertible to a sulfonic acid functional group include ($-SO_2F$), ($-SO_2Cl$), and ($-SO_2Br$).

The compound represented by the formula (2) is preferably a compound represented by the formula (2-1), a compound represented by the formula (2-2) or a compound represented by the formula (2-3).

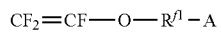 Formula (2-1)

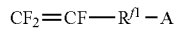 Formula (2-2)

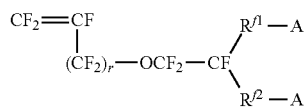 Formula (2-3)

$R^{f1}$, $R^{f2}$, r and A in the formulae are the same as defined above.

The compound represented by the formula (2) is more preferably a compound represented by the formula (2-4).

 Formula (2-4)

M, x, y, z and Y in the formula are the same as defined above.

Specific examples of the compound represented by the formula (2-1) include the following compounds wherein w is an integer of from 1 to 8, and x is an integer of from 1 to 5.

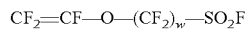

Specific examples of the compound represented by the formula (2-2) include the following compounds wherein w is an integer of from 1 to 8.

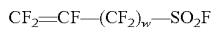

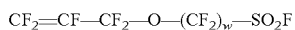

The compound represented by the formula (2-3) is preferably a compound represented by the formula (2-3-1).

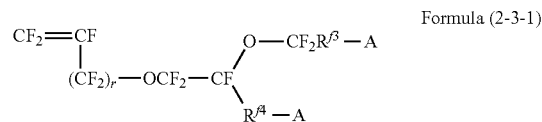 Formula (2-3-1)

$R^{f3}$, $R^{f4}$, r and A in the formula are the same as defined above.

Specific examples of the compound represented by the formula (2-3-1) include the following compounds:

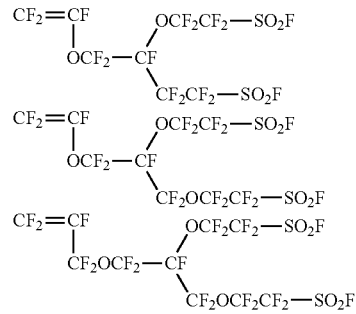

The fluorine-containing monomer (S') may be a single species or a combination of two or more species.

For production of the fluorinated polymer (S'), in addition to the fluoroolefin and the fluorine-containing monomer (S'), an additional monomer may be used. The additional monomer may be any of those mentioned previously.

The ion exchange capacity of the fluorinated polymer (S) can be adjusted by changing the content of units based on the fluorine-containing monomer (S') in the fluorinated polymer (S'). The content of sulfonic acid functional groups in the fluorinated polymer (S) is preferably the same as that of groups convertible to sulfonic acid functional groups in the fluorinated polymer (S').

The precursor membrane may be formed, for example, by extrusion.

The ion exchange membrane having a multilayer structure may be produced, for example, by laminating multiple layers of fluorinated polymers having groups convertible to sulfonic acid functional groups by co-extrusion.

The conversion of groups convertible to sulfonic aid functional groups in the precursor membrane to sulfonic acid functional groups may be carried out, for example, by hydrolyzing the precursor membrane or converting the precursor membrane to the acid form, preferably by contacting the precursor membrane with an aqueous alkaline solution.

Contact of the precursor membrane with an aqueous alkaline solution may be made, for example, by immersing the precursor membrane in the aqueous alkaline solution or by spraying the aqueous alkaline solution onto the surface of the precursor membrane.

The temperature of the aqueous alkaline solution is preferably from 30 to 70° C., more preferably from 40 to 60° C., in view of adjustment of the size of ionic clusters.

The duration of the contact between the precursor membrane and the aqueous alkaline solution is preferably at most 100 minutes, preferably from 3 to 80 minutes, more preferably from 20 to 60 minutes in view of adjustment of the size of ionic clusters.

Though the temperature of the aqueous alkaline solution may be above 70° C., in such a case, it is preferred to dry the ion exchange membrane resulting from contact of the precursor membrane with an aqueous alkaline solution The aqueous alkaline solution preferably comprises an alkali metal hydroxide, a water-miscible organic solvent and water. Specific examples of the alkali metal hydroxide are sodium hydroxide and potassium hydroxide.

The water-miscible organic solvent is an organic solvent which easily dissolves in water, and specifically, preferred is an organic solvent with a solubility of at least 0.1 g in 1,000 ml of water (20° C.), and more preferred is an organic solvent with a solubility of at least 0.5 g. The water-miscible organic solvent preferably contains at least one member selected from the group consisting of aprotic organic solvents, alcohols and amino alcohols, and more preferably contains an aprotic organic solvent.

The water-miscible organic solvent may be a single species or a combination of two or more species.

Specific examples of the aprotic organic solvents include dimethyl sulfoxide, N,N-dimethylformamide, N,N-dimethylacetamide, N-methyl-2-pyrrolidone and N-ethyl-2-pyrrolidone, and dimethyl sulfoxide is preferred.

Specific examples of the alcohols include methanol, ethanol, isopropanol, butanol, methoxyethoxyethanol, butoxyethanol, butyl carbitol, hexyloxyethanol, octanol, 1-methoxy-2-propanol and ethylene glycol.

Specific examples of the amino alcohols include ethanolamine, N-methylethanolamine, N-ethylethanolamine, 1-amino-2-propanol, 1-amino-3-propanol, 2-aminoethoxyethanol, 2-aminothioethoxyethanol and 2-amino-2-methyl-1-propanol.

The concentration of the alkali metal hydroxide in the aqueous alkaline solution is preferably from 1 to 60 mass %, more preferably from 3 to 55 mass %, further preferably from 5 to 50 mass %.

The content of the water-miscible organic solvent in the aqueous alkaline solution is preferably from 1 to 60 mass %, more preferably from 3 to 55 mass %, further preferably from 4 to 50 mass %.

The content of water in the aqueous alkaline solution is preferably from 39 to 80 mass %.

After the contact of the precursor membrane with an aqueous alkaline solution, the aqueous alkaline solution may be removed. The aqueous alkaline solution may be removed, for example, by washing the precursor membrane which have been contacted with the aqueous alkaline solution with water.

After the contact of the precursor membrane with an aqueous alkaline solution, the resulting ion exchange membrane may be dried, preferably by heating, preferably at a heating temperature of from 50 to 160° C., more preferably from 80 to 120° C., preferably for a heating time of from 6 to 24 hours.

If necessary, after contact of the precursor membrane with an aqueous alkaline solution (or after drying), the resulting ion exchange membrane may be brought in contact with an aqueous acidic solution to convert the sulfonic acid functional groups to —$SO_3H$.

As the acid in the aqueous acidic solution, sulfuric aid or hydrochloric acid may, for example, be mentioned.

As mentioned above, the ion exchange membrane may contain a reinforcing material.

For production of an ion exchange membrane containing a reinforcing material, a precursor membrane comprising a fluorinated polymer having groups convertible to sulfonic acid functional groups and a reinforcing material is used. A precursor membrane comprising a fluorinated polymer having groups convertible to sulfonic acid functional groups and a reinforcing material may be produced by laminating a layer of a fluorinated polymer having groups convertible to sulfonic acid functional groups, a reinforcing material, and another layer of a fluorinated polymer having groups convertible to sulfonic acid functional groups disposed in this order by laminating rolls or by a vacuum lamination apparatus.

[Redox Flow Battery]

The redox flow battery (redox flow secondary battery) of the present invention comprises a cell equipped with a positive electrode and a negative electrode and the ion exchange membrane, which is installed in the cell as a partition between the positive electrode and the negative electrode. The positive side of the cell separated by the ion exchange membrane is a positive half-cell which contains a positive electrolyte, and the negative side is a negative half-cell containing a negative electrolyte containing an active substance.

A vanadium redox flow battery is charged or discharged by circulating a sulfate electrolyte containing tetravalent vanadium ($V^{4+}$) and pentavalent vanadium ($V^{5+}$) as the positive electrolyte through the positive half-cell and circulating a negative electrolyte containing trivalent vanadium ($V^{3+}$) and divalent vanadium ($V^{2+}$) through the negative half-cell. When the battery is being charged, $V^{4+}$ ions are oxidized to $V^{5+}$ losing an electron in the positive half-cell, while in the negative half-cell $V^{3+}$ is reduced to $V^{2+}$ by an electron returning thorough an outside circuit. In the redox reactions, the positive half-cell becomes rich in positive charges, while the negative half-cell becomes deficient in positive charges. The ion exchange membrane allows selective transfer of protons from the positive half-cell to the negative half-cell to keep them electrically neutral. During discharging, this reaction is reversed.

EXAMPLES

Now, the present invention will be described in detail with reference to Examples, but the present invention is not limited thereto. The blend amounts of the respective components in Table given later are based on mass.

[Thickness of Ion Exchange Membrane]

The thickness of an ion exchange membrane was determined by analyzing the cross sectional image of the ion exchange membrane under an optical microscope by image analysis software, after 2 hours of drying at 90° C.

[Ion Exchange Capacity of Fluorinated Polymer]

The weight of a fluorinated polymer (S) was measured after it was dried at 90° C. under a reduced pressure below $1/10$ atm (76 mmHg) for 16 hours, as the dry mass of the fluorinated polymer (S). The dry fluorinated polymer (S) was soaked in 2 mol/L aqueous sodium chloride at 60° C. for 1 hour. The fluorinated polymer (S) was recovered and washed with ultrapure water, and the solution in which the fluorinated polymer (S) had been soaked was titrated with 0.1 mol/L aqueous sodium hydroxide. The ion exchange capacity of the fluorinated polymer (S) was obtained by dividing the titration value by the dry mass of the resin used.

[Distance (D) Between Clusters]

An ion exchange membrane to be measured was soaked in 1 M aqueous sulfuric acid for 24 hours and then in water at 25° C. for 24 hours. The resulting wet ion exchange membrane was analyzed by an X ray diffractometer, and angles at which the measured scattering intensity peaks were calculated.

For small angle X-ray scattering, a wet ion exchange membrane was sealed with water in a thin film bag (preferably which has no peak in small angle X-ray scattering intensity) and placed on a sample stage. Scattering profiles were measured at room temperature in a q range of about 0.1-5 (nm$^{-1}$) where q is the modulus of scattering vector defined as q=4π/λ×sin(θ/2), λ is the wavelength of incident X ray, and θ is the scattering angle.

Measurements were made using "Aichi Synchrotron BL8S3" at an incident X ray wavelength of 1.5 Å (8.2 keV), with a beam size of about 850 μm×280 μm, a camera distance of 1121 mm, a detector R-AXIS IV (imaging plate) and an irradiation time of 60 sec. The resulting two-dimensional data were processed into one-dimensional data by circular averaging, and then corrected for imaging plate background, transmission, atmospheric scattering, empty cell scattering and sample thickness.

A peak detected in a scattering profile thus obtained indicates regularity in the morphology of the ion exchange membrane. In general, the position ($q_m$) of the peak detected in the range of q=0.8~4 (nm$^{-1}$) is a factor indicating the distance between ionic clusters.

The distance between ionic clusters was calculated from the peak position using the following formula.

$$D=2\pi/q_m\text{(nm)} \qquad \text{Formula E}$$

[Diameter (Dc) of Ionic Clusters]

A 4 cm×4 cm-square sample of an ion exchange membrane to be measured was soaked in 1 M aqueous sulfuric acid for 24 hours and then in water at 25° C. for 24 hours, and the wet mass (W1) of the ion exchange membrane was measured. The wet ion exchange membrane was dried at 90° C. under a reduced pressure below 1/10 atm (76 mmHg) for 16 hours, and the dry mass (W2) of the ion exchange membrane was measured. The water content (Δm) represented by the formula (F) was calculated from W1 and W2.

$$\Delta m=(W1-W2)/W2 \qquad \text{Formula (F)}$$

Then, the diameter Dc of ionic clusters was calculated by referring to the previously mentioned ion cluster model proposed by Gierke et al, specifically speaking, by the following formula (D).

$$Dc=\{(\Delta V/(1-\Delta V))\times D^3\times(6/\pi)\}^{1/3} \qquad \text{Formula (D)}$$

In the formula, D (nm) is calculated by the above formula (E), and ΔV was calculated by the formula (A).

$$\Delta V=\rho_p\Delta m/\rho_w \qquad \text{Formula (A)}$$

In the formula (A), Δm is calculated as described above, $\rho_p$ is the density of a fluorinated polymer having sulfonic acid functional groups, 2.1 (g/cm$^3$), and $\rho_w$ is the density of water, 1.0 (g/cm$^3$).

[Current Efficiency, Voltage Efficiency, and Power Efficiency]

Liquid-permeable carbon felt was laid over both surfaces of an ion exchange membrane prepared as described later. The carbon-felt-covered ion exchange membrane was sandwiched by graphite electrodes and pressed under a given pressure to form a laminate consisting of a graphite electrode, a carbon felt layer, an ion exchange membrane, a carbon felt layer and a graphite electrode in this order. The resulting laminate was set in a PTFE cell frame to obtain a rechargeable cell having a cell frame partitioned by the laminate.

A sulfate electrolyte solution containing tetravalent and pentavalent vanadium was circulated through one of the half-cells as the positive half-cell, while a sulfate electrolyte solution containing trivalent and divalent vanadium was circulated through the other half-cell as the negative half-cell, and a charge-discharge test was conducted.

Charge and discharge were carried out at a current density of 80 mA/cm$_2$ at a total vanadium ion concentration in both half-cells of 1.6 mol/L.

The current efficiency (%) was obtained by dividing the electricity extracted during discharging by the electricity required during charging, i.e., by the following formula.

Current efficiency (%)={(electricity extracted during discharging)/(electricity required during charging)}×100

The voltage efficiency (%) was obtained by dividing the average cell voltage during discharging by the average cell voltage during charging, i.e., by the following formula.

Voltage efficiency (%)={(average cell voltage during discharging)/(average cell voltage during charging)}×100

The energy efficiency is the product of current efficiency and voltage efficiency.

A high current efficiency indicates that suppression of excessive transfer of vanadium ions across the ion exchange membrane.

A high voltage efficiency means that the resistance of the rechargeable cell (the total resistance including ion exchange membrane resistance, solution resistance, contact resistance and the like) is low.

A high energy efficiency means a small charge/discharge energy loss.

Example 1

Polymer S1 obtained by polymerizing TFE and a monomer represented by the following formula (X) was fed to a pellet melt-extruder to obtain pellets of Polymer S1.

$$CF_2=CF-O-CF_2CF(CF_3)-O-CF_2CF_2-SO_2F \qquad (X)$$

Then, the pellets of Polymer S1 were fed to a film melt-extruder and extruded into a film to obtain a precursor membrane of Polymer S1.

The precursor membrane was kept in contact with an aqueous alkaline solution containing 5.5 mass % of dimethyl sulfoxide and 30 mass % of potassium hydroxide heated to 55° C. for 60 minutes with its peripheries sealed in a PTFE packing.

After the above-mentioned treatment, the resulting membrane was washed with water to obtain the ion exchange membrane of Example 1.

Examples 2 to 4 and Comparative Examples 1 to 3

The procedure in Example 1 was followed except that the ion exchange capacity after hydrolysis, the thickness of the ion exchange membrane, the composition and temperature of the aqueous alkaline solution and the duration of the contact with the aqueous alkaline solution were changed as shown in Table 1 to obtain ion exchange membranes.

In Example 2, however, the precursor membrane was kept in contact with an alkaline solution and washed, and then the resulting membrane was soaked in 1 M aqueous sulfuric acid, then washed with water, dried at 100° C. for 12 hours and soaked again in 1 M aqueous sulfuric acid for 30 minutes to obtain an ion exchange membrane.

The ion exchange capacities were set at the figures shown in Table 1 by adjusting the ratio of TFE to the monomer represented by the formula (X) in the polymerization, and the thicknesses were set at the figures shown in Table 1 by adjusting the amount of the resin fed to the extruder.

The current efficiency, voltage efficiency and energy efficiency of the ion exchange membranes were measured as described above. The results are shown in Table 1.

In Table 1, "AR" indicates the ion exchange capacity (meq/g dry resin) of the fluorinated polymer in an ion exchange membrane, and "thickness (μm)" indicates the thickness of an ion exchange membrane.

"Heating temperature (° C.)" indicates whether the heating treatment was done after washing with water, and "-" indicates that no heating treatment was done, and when heating treatment was done, the heating temperature is shown.

"D" is the distance D between ionic clusters calculated as mentioned above.

"Dc" is the diameter Dc of ionic clusters calculated as mentioned above.

"D−Dc" is the difference between D and Dc.

TABLE 1

| | | Hydrolysis conditions | | | | | | | Evaluation | | |
| | | DMSO | | | | | | | | | |
| | AR | Thickness (μm) | (mass %)/ KOH (mass %) | Temperature (° C.) | Time (min) | Heating temperature (° C.) | D (nm) | Dc (nm) | D − Dc (nm) | Current efficiency (%) | Voltage efficiency (%) | Energy efficiency (%) |
|---|---|---|---|---|---|---|---|---|---|---|---|---|
| Ex. 1 | 1.0 | 50 | 5.5/30 | 55 | 60 | — | 4.34 | 3.65 | 0.69 | 95.7 | 87.9 | 84.1 |
| Ex. 2 | 1.0 | 50 | 5.5/30 | 95 | 60 | 100 | 4.38 | 3.63 | 0.75 | 96.0 | 87.7 | 84.2 |
| Ex. 3 | 1.0 | 50 | 5.5/30 | 40 | 120 | — | 4.25 | 3.53 | 0.72 | 96.2 | 87.4 | 84.1 |
| Ex. 4 | 1.0 | 50 | 10/30 | 55 | 60 | — | 4.44 | 3.79 | 0.65 | 95.4 | 87.7 | 83.7 |
| Com. Ex. 1 | 1.0 | 50 | 5.5/30 | 95 | 60 | — | 4.55 | 4.03 | 0.52 | 94.0 | 88.2 | 82.9 |
| Com. Ex. 2 | 1.0 | 50 | 40/10 | 55 | 60 | — | 4.20 | 3.65 | 0.55 | 93.9 | 88.1 | 82.7 |
| Com. Ex. 3 | 0.90 | 50 | 5.5/30 | 55 | 60 | — | 4.00 | 3.23 | 0.77 | 96.8 | 85.5 | 82.8 |

As shown in Table 1, the redox flow batteries using ion exchange membranes of the present invention were excellent in energy efficiency and also excellent in current efficiency without a drop in voltage efficiency.

This application is a continuation of PCT Application No. PCT/JP2018/041161 filed on Nov. 6, 2018, which is based upon and claims the benefit of priority from Japanese Patent Application No. 2017-213888 filed on Nov. 6, 2017. The contents of those applications are incorporated herein by reference in their entireties.

EXPLANATION OF REFERENCE SYMBOLS

10: ion cluster,
12: ion channel

What is claimed is:

1. A redox flow battery, comprising an ion exchange membrane comprising a fluorinated polymer having sulfonic acid functional groups, wherein a diameter Dc of ionic clusters is from 3.53 to 4.40 nm, the distance D between ionic clusters is from 4.25 to 5.00 nm, the difference (D-Dc) between the distance D between ionic clusters and the diameter Dc of ionic clusters as measured by small angle X-ray scattering is at least 0.60 nm, and the ion exchange capacity of the fluorinated polymer is at least 0.95 meq/g dry resin.

2. The redox flow battery according to claim 1, wherein the difference (D−Dc) between the distance D between ionic clusters and the diameter Dc of ionic clusters is at least 0.70 nm.

3. The redox flow battery according to claim 1, wherein the ion exchange capacity of the fluorinated polymer is from 1.00 to 1.10 meq/g dry resin.

4. The redox flow battery according to claim 1, which is from 30 to 500 μm in thickness.

5. The redox flow battery according to claim 1, wherein the fluorinated polymer comprises units based on a fluoroolefin and units based on a fluorine-containing monomer having a sulfonic acid functional group.

6. The redox flow battery according to claim 5, wherein the units based on a fluoroolefin are based on tetrafluoroethylene.

7. The redox flow battery according to claim 5, wherein the units based on a fluorine-containing monomer having a sulfonic acid functional group are represented by the formula (1):

—[CF$_2$—CF(-L-(SO$_3$M)$_n$)]—     Formula (1):

wherein L is a (n+1)-valent perfluorinated hydrocarbon group which may contain an oxygen atom, M is a hydrogen atom, an alkali metal or a quaternary ammonium cation, and n is 1 or 2.

8. The redox flow battery according to claim 7, wherein the units represented by the formula (1) are units represented by the formula (1-4):

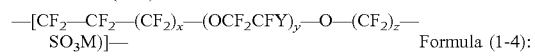

—[CF$_2$—CF$_2$—(CF$_2$)$_x$—(OCF$_2$CFY)$_y$—O—(CF$_2$)$_z$—SO$_3$M)]—     Formula (1-4):

wherein M is a hydrogen atom, an alkali metal or a quaternary ammonium cation, x is 0 or 1, y is an integer of 0 to 2, z is an integer of 1 to 4, and Y is F or CF$_3$.

9. The redox flow battery according to claim 1, which has a reinforcing material inside.

10. The redox flow battery according to claim 1, wherein the ion exchange membrane does not contain a polymer other than the fluorinated polymer having sulfonic acid functional groups, and the fluorinated polymer having sulfonic acid functional groups consists of units based on a fluoroolefin and units based on a fluorine-containing monomer having a sulfonic acid functional group.

* * * * *